United States Patent
Domeier

(10) Patent No.: US 10,279,939 B2
(45) Date of Patent: May 7, 2019

(54) FORM FILL MACHINE AND METHOD FOR MOLDING AND FILLING CONTAINERS

(71) Applicant: KRONES AG, Neutraubling (DE)

(72) Inventor: Bernhard Domeier, Hohengebraching (DE)

(73) Assignee: KRONES AG, Neutraubling (DE)

( * ) Notice: Subject to any disclaimer, the term of this patent is extended or adjusted under 35 U.S.C. 154(b) by 761 days.

(21) Appl. No.: 14/814,958

(22) Filed: Jul. 31, 2015

(65) Prior Publication Data

US 2016/0052653 A1 Feb. 25, 2016

(30) Foreign Application Priority Data

Aug. 20, 2014 (EP) ..................................... 14181664

(51) Int. Cl.
*B65B 3/02* (2006.01)
*B65B 3/26* (2006.01)
(Continued)

(52) U.S. Cl.
CPC .............. *B65B 39/12* (2013.01); *B29C 49/12* (2013.01); *B29C 49/46* (2013.01); *B65B 3/022* (2013.01);
(Continued)

(58) Field of Classification Search
CPC ......... B65B 39/12; B65B 39/145; B65B 3/26; B65B 3/30; B65B 3/34; B65B 3/36; B65B 3/022; B29C 49/12; B29C 49/78; B29C 49/78261; B29C 49/78932; B29C 49/78529; B29C 2049/1252–2049/1295;
(Continued)

(56) References Cited

U.S. PATENT DOCUMENTS 2,319,075 A * 5/1943 McKinnis ............. B65B 31/044
141/100
2,711,279 A * 6/1955 Day ......................... B67C 3/16
141/117

(Continued)

FOREIGN PATENT DOCUMENTS

DE 2209494 A1 * 9/1973 ............. B29C 49/58
DE 102006019518 A1 * 1/2007 ............. B65B 3/003

(Continued)

OTHER PUBLICATIONS

European Search Report for application No. 14181664.5 dated Mar. 12, 2015.

*Primary Examiner* — Stephen F. Gerrity
*Assistant Examiner* — Joshua G Kotis
(74) *Attorney, Agent, or Firm* — Marshall, Gerstein & Borun LLP

(57) ABSTRACT

A method and apparatus for forming, by means of expansion, plastic preforms into plastic containers in a hollow mold and for filling a substantially liquid product or at least a liquid or solid component of the product into the plastic containers in the hollow mold. The product is filled into the plastic containers while the respective plastic container has inserted therein, at least partially, a stretching rod or a filler neck, and the insertion depth of the stretching rod or of the filler neck is, at the end of the filling process, adjusted such that the volume displaced in the product by the stretching rod or the filler neck corresponds to a predetermined desired ullage.

11 Claims, 4 Drawing Sheets

(51) Int. Cl.
  *B29C 49/28* (2006.01)
  *B65B 39/12* (2006.01)
  *B29C 49/46* (2006.01)
  *B29C 49/12* (2006.01)
  *B65B 3/30* (2006.01)
  *B67C 3/26* (2006.01)
  *B65B 39/14* (2006.01)
  *B29C 49/78* (2006.01)
  *B29C 49/06* (2006.01)
  *B29C 49/36* (2006.01)
  *B65B 31/04* (2006.01)
  *B29K 105/00* (2006.01)
  *B29L 31/00* (2006.01)
  *B65B 3/10* (2006.01)
  *B65B 39/00* (2006.01)

(52) U.S. Cl.
  CPC .............. *B65B 3/30* (2013.01); *B65B 39/145* (2013.01); *B67C 3/26* (2013.01); *B29C 49/06* (2013.01); *B29C 49/36* (2013.01); *B29C 49/78* (2013.01); *B29C 2049/4664* (2013.01); *B29C 2949/78621* (2013.01); *B29C 2949/78932* (2013.01); *B29C 2949/78983* (2013.01); *B29K 2105/253* (2013.01); *B29L 2031/7158* (2013.01); *B65B 3/10* (2013.01); *B65B 3/26* (2013.01); *B65B 31/042* (2013.01); *B65B 2039/009* (2013.01)

(58) Field of Classification Search
  CPC .......... B67D 7/12; B67C 3/282; B67C 3/285; B67C 3/286; B67C 2003/2654; B67C 2003/2671
  USPC .......... 53/452, 574, 575; 425/524; 264/532; 141/198, 260, 266, 270, 279, 284, 374
  See application file for complete search history.

(56) References Cited

U.S. PATENT DOCUMENTS

| | | | | |
|---|---|---|---|---|
| 3,196,592 | A * | 7/1965 | Cheney | B29C 47/20 425/117 |
| 3,402,857 | A * | 9/1968 | Ecklund | B67C 3/26 141/374 |
| 3,827,214 | A * | 8/1974 | Naumann | B29C 49/58 425/524 |
| 4,437,497 | A * | 3/1984 | Enander | B65B 3/26 137/386 |
| 5,866,061 | A * | 2/1999 | Miyamoto | B29C 49/04 264/524 |
| 6,576,171 | B1 * | 6/2003 | Devenoges | B29C 49/12 264/40.1 |
| 8,720,166 | B2 * | 5/2014 | Chauvin | B29C 49/4268 264/524 |
| 8,985,164 | B2 * | 3/2015 | Seeman | B65B 3/30 141/5 |
| 2004/0009257 | A1 * | 1/2004 | Galloni | B29C 49/12 425/529 |
| 2005/0206045 | A1 * | 9/2005 | Desanaux | B29C 49/46 264/535 |
| 2007/0220835 | A1 * | 9/2007 | Till | B29C 49/42 53/471 |
| 2008/0142115 | A1 * | 6/2008 | Vogt | B67D 1/0007 141/374 |
| 2011/0031659 | A1 | 2/2011 | Warner et al. | |
| 2012/0085071 | A1 * | 4/2012 | Hahn | B29C 49/6436 53/411 |
| 2012/0207873 | A1 | 8/2012 | Eberle et al. | |
| 2012/0266567 | A1 * | 10/2012 | Haesendonckx | B29C 49/12 53/456 |
| 2013/0106027 | A1 * | 5/2013 | Maki | B29D 22/003 264/524 |
| 2013/0187304 | A1 * | 7/2013 | Deau | B29C 49/12 264/40.3 |
| 2014/0209204 | A1 * | 7/2014 | Yamaguchi | C12M 33/04 141/1 |
| 2014/0300035 | A1 * | 10/2014 | Eberle | B29C 49/0073 264/529 |
| 2014/0367895 | A1 * | 12/2014 | Sato | B29C 49/46 264/532 |
| 2015/0328824 | A1 * | 11/2015 | Morikami | B29C 49/12 425/524 |
| 2015/0336688 | A1 * | 11/2015 | Chauvin | B29C 49/12 53/469 |
| 2016/0001488 | A1 * | 1/2016 | Clusserath | B23K 1/0016 264/525 |
| 2016/0023785 | A1 * | 1/2016 | Clusserath | B65B 3/022 264/40.1 |

FOREIGN PATENT DOCUMENTS

| | | | |
|---|---|---|---|
| EP | 1529620 B1 | 2/2009 | |
| EP | 2799208 A1 | 11/2014 | |
| FR | 2603573 A1 * | 3/1988 | ............ B67C 3/285 |
| FR | 2971234 A1 | 8/2012 | |
| WO | WO-2013063453 A1 | 5/2013 | |
| WO | WO-2013099108 A1 | 7/2013 | |
| WO | WO-2014103188 A1 | 7/2014 | |

* cited by examiner

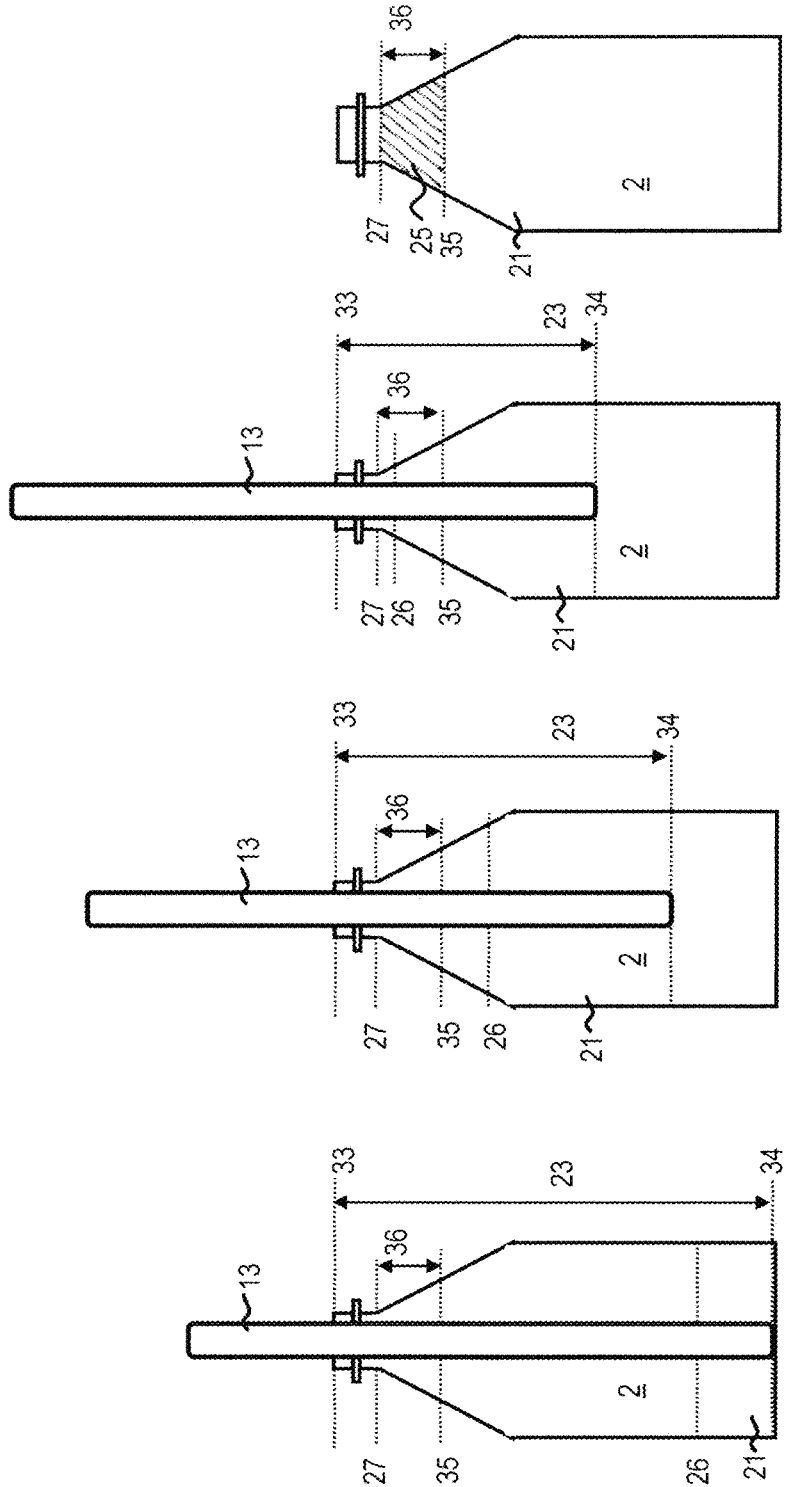

FORM FILL MACHINE AND METHOD FOR MOLDING AND FILLING CONTAINERS

CROSS-REFERENCE TO RELATED APPLICATION

The present application claims priority to European Application No. 14 181 664.5, filed Aug. 20, 2014. The priority application, EP 14 181 664.5 is hereby incorporated by reference.

FIELD OF THE DISCLOSURE

The present disclosure relates to a form fill machine and to a method for molding and filling plastic containers, wherein the product is filled into the plastic containers while the respective plastic container has inserted therein, at least partially, a stretching rod or a filler neck.

BACKGROUND

It is well known that plastic containers can be produced from preforms in a stretch blow molding process.

Alternatively to inflating the containers with compressed air, EP 1529620 B1 describes a method of hydraulically shaping preforms into plastic bottles. To this end, the preforms are first heated and then transferred to a hollow mold where they are stretched in a longitudinal direction. In addition, mineral water or the like is introduced under excess pressure so as to establish the final container shape. The mineral water remains in the container, so that a subsequent separate filling step can be dispensed with.

US 2011/0031659 A1 additionally describes a method comprising the steps of stretching a heated preform by means of a stretching rod and expanding it then hydraulically by means of an incompressible fluid, in particular water, so as to form a container. Subsequently, the fluid is displaced by means of compressed air and exits the container.

When a stretching rod is also used for filling in the product or when a filler neck is introduced in the container for the purpose of filling, they displace a certain volume in the filled-in product. It follows that, when the stretching rod or the filler neck are removed from the container at the end of the filling process, the filling level will drop. In addition to the fact that the final filling level deviates from the desired filling level, also the ullage is larger than desired, since, with the stretching rod or the filler neck inserted, a smaller amount of filled-in product will already suffice to reach a maximum admissible filling level. Hence, the problem arises that the final filling level of the liquid product may vary, and especially that it may be lower than the desired filling level.

SUMMARY OF THE DISCLOSURE

It is one aspect of the present disclosure to further develop known devices and methods for molding and filling plastic containers in an advantageous manner such that the final filling level can be adjusted with the highest possible precision.

The disclosure relates to a method for forming, by means of expansion, plastic preforms into plastic containers in a hollow mold and for filling a substantially liquid product or at least a liquid or solid component of the product into the plastic containers in the hollow mold, the product being filled into the plastic containers while the respective plastic container has inserted therein, at least partially, a stretching rod or a filler neck. According to the present disclosure, the insertion depth of the stretching rod or of the filler neck is, at the end of the filling process, adjusted such that the volume displaced in the product by the stretching rod or the filler neck corresponds to a predetermined desired ullage.

By means of the method according to the present disclosure, the final filling level can be adjusted precisely.

Liquids, also liquids having carbon dioxide or the like dissolved therein, are, by definition, incompressible fluids with respect to their function in the process of molding and filling the containers, in contrast to gases, which are functionally defined as compressible fluids.

The stretching rod may be configured such that it stretches the plastic preform such that it touches the bottom of the hollow mold. The stretching rod may comprise openings through which a fluid, in particular the product, can flow into the plastic container or out of the plastic container. Alternatively, the fluid and the product, respectively, can be filled into the plastic container independently of the stretching rod. The use of a stretching rod may be dispensed with in the case of the present method. The product can then be filled in by means of the filler neck.

The insertion depth of the stretching rod or of the filler neck corresponds to the distance between the upper edge of the premolded neck area of the plastic container and the lower end of the stretching rod or of the filler neck. "Lower" refers here to the end facing the bottom of the plastic container. The ullage is the volume between the maximum admissible filling level during the filling process, in particular the upper edge of the plastic container or the lower edge of the already premolded neck area of the plastic container, and the filling level of the product. Accordingly, the desired ullage is the volume between the desired filling level and the maximum admissible filling level. The ullage is typically filled with a gas, e.g. air. The desired filling level and the desired ullage are predetermined values. Typically, it is desired to minimize the ullage.

The filling process is considered finished, when a predetermined desired amount of the product has been filled into the plastic container.

The insertion depth of the stretching rod and of the filler neck can be adjusted, in particular in a time-dependent manner, such that an actual filling level will not exceed a predetermined maximum admissible filling level in the plastic container at any moment in time during the filling process. Thus, the product can reliably be prevented from spilling over.

The maximum filling level can be reached at least at one moment in time of the filling process, in particular at the end. This especially solves a problem that arises when the plastic container is molded by means of the product, viz. the problem that it may perhaps be insufficient, when the product does not exceed the desired filling level at any moment in time. The desired filling level lies often below, and in some cases a good deal below, the neck area of the plastic container, and if said desired filling level is not exceeded, the containers may possibly be molded incompletely in the shoulder area.

The insertion depth may remain the same during the filling process, and may only be changed at the end of the filling process by removing the stretching rod or the filler neck from the plastic container. This method is very simple, since an adjustment of the insertion depth is not necessary. This is possible, when the volume displaced by the stretching rod or the filler neck at the end of the filling process does not exceed the desired ullage, and as long as the sum of the volume of the inserted part of the stretching rod or of the filler neck is smaller than the volume given by the maximum filling level. In these cases an overspill will be prevented, although the insertion depth of the stretching rod or of the filler neck is not changed.

The stretching rod or the filler neck may be immersed, at least partially, in the product during the entire filling process. This allows the product to be filled in uniformly because splashing is prevented.

The insertion depth of the stretching rod or of the filler neck can be reduced as the filling level rises, and can especially be reduced such that the stretching rod or the filler neck is immersed, at least partially, in the product during the entire filling process.

The reduction of the insertion depth can take place continuously or in discrete steps.

The insertion depth of the stretching rod or of the filler neck may especially be reduced such that the volume displaced in the product by the stretching rod or the filler neck does not increase, and remains in particular equal or decreases.

If, as described above, the insertion depth of the stretching rod or of the filler neck is reduced as the filling level increases, a larger amount of the product can, in total, be filled in, without the maximum filling level being exceeded. In addition, filling in can be carried out more uniformly, since less currents and bubbles will be created in the product which has already been filled in and which is contained in the lower part of the plastic container.

The insertion depth of the stretching rod or of the filler neck can be adjusted based on predetermined values and/or based on measurement values of a filling level meter.

These predetermined values may comprise the volume of the stretching rod or of the filler neck depending on the insertion depth, the volume of the container, the height of the container, the shape of the container, the desired ullage, the desired amount of product, the filling speed and/or the maximum admissible filling level. The insertion depth can be ascertained from these values. When the filling speed is taken into consideration, the insertion depth can especially also be adjusted in a time-dependent manner.

A filling level meter can determine the actual filling level or a relative filling level in comparison with a reference value, e.g. the maximum admissible filling level and/or the desired filling level. For example, a closed-loop control unit may be provided, which compares the actual filling level to the desired filling level, in particular during the whole filling process, so that, on the basis of this comparison, the insertion depth can be adjusted such that the maximum desired filling level is not exceeded and/or that the stretching rod or the filler neck is immersed in the product, at least partially, during the entire filling process and/or that the stretching rod or the filler neck displaces precisely the desired ullage at the end of the filling process.

The above-mentioned definitions and features as well as the advantages described in connection with the method also apply to the form fill machine according to the present disclosure described hereinbelow.

The form fill machine according to the present disclosure comprises at least one treatment station for forming, by means of expansion, plastic preforms into plastic containers in a hollow mold and for filling a substantially liquid product or at least a liquid or solid component of the product into the plastic containers in the hollow mold, wherein said form fill machine comprises an adjustment unit for adjusting an insertion depth of a stretching rod or of a filler neck into the plastic container. According to the present disclosure, the adjustment unit is configured such that, at the end of the filling process, the insertion depth of the stretching rod or of the filler neck is adjusted such that the volume displaced in the product by the stretching rod or the filler neck corresponds to a predetermined desired ullage.

The adjustment unit may be configured for simultaneously holding and moving, in particular for discretely or continuously moving, the stretching rod or the filler neck along the stroke. The adjustment unit may, for example, comprise cams and/or articulated arms with grippers. The adjustment unit may comprise a drive, e.g. a servomotor, which is configured such that it is able to move the stretching rod or the filler neck and to adjust the insertion depth in this way. The adjustment unit, in particular the drive, may be controllable, e.g. by a control and/or closed-loop control unit. The adjustment unit may, alternatively or additionally, be configured for manually adjusting the insertion depth.

The adjustment unit may be adjusted such that an actual filling level will not exceed the maximum admissible filling level in the plastic container at any moment in time during the filling process.

The form fill machine may comprise a control and/or closed-loop control unit, wherein said control and/or closed-loop control unit is configured such that it controls, in particular in a time-dependent manner, the adjustment unit for adjusting the insertion depth of the stretching rod.

The control and/or closed-loop control unit may control the adjustment unit in particular such that an actual filling level will not exceed the maximum admissible filling level in the plastic container at any moment in time during the filling process.

The control and/or closed-loop control unit may control the adjustment unit such that the insertion depth of the stretching rod or of the filler neck will be reduced as the filling level rises, and will especially be reduced such that the stretching rod or the filler neck is immersed, at least partially, in the product during the entire filling process.

The control and/or closed-loop control unit may be configured such that it controls the adjustment unit based on predetermined values and/or based on measurement values of a filling level meter.

BRIEF DESCRIPTION OF THE DRAWINGS

Other features and advantages will be explained in the following making reference to the exemplary figures, in which

FIG. 3 shows a not-to-scale schematic representation of a container, at a first moment in time during the filling process, with a stretching rod at a stretching position;

FIG. 4 shows a not-to-scale schematic representation of a container at a second moment in time during the filling process;

FIG. 5 shows a not-to-scale schematic representation of a container at a third moment in time during the filling process;

FIG. 6 shows a not-to-scale schematic representation of a container at the end of the filling process after the removal of the stretching rod or of the filler neck;

DETAILED DESCRIPTION

Figure 1:
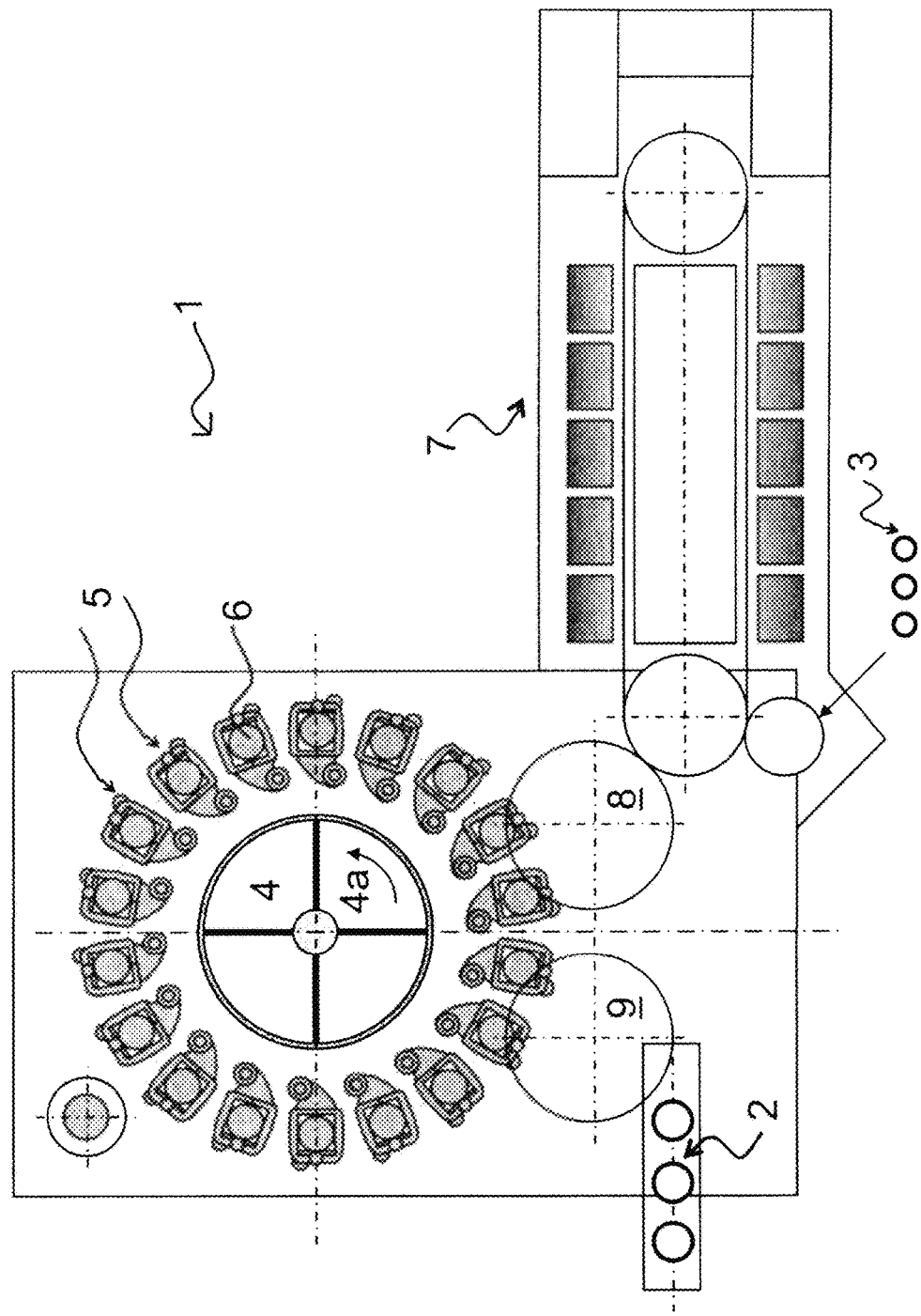
FIG. 1 shows a not-to-scale schematic representation of a form fill machine.

FIG. 1 shows a form fill machine 1 for molding and filling plastic containers 2. The containers are obtained by forming plastic preforms 3 by means of expansion. This is done in a respective treatment station 5 for each individual plastic preform. The form fill machine comprises a carousel 4 having the treatment stations attached thereto and rotating continuously in a direction of rotation 4a, when in operation. Each treatment station comprises a hollow mold 6, in which a plastic container is molded and filled with the product. The plastic preforms are heated in an oven 7 and transported by means of a feeder star wheel 8 into the respective treatment station where they are introduced in the hollow mold. After having been molded and filled, the plastic containers are removed from the respective hollow mold by means of a discharge star wheel 9.

Figure 2:
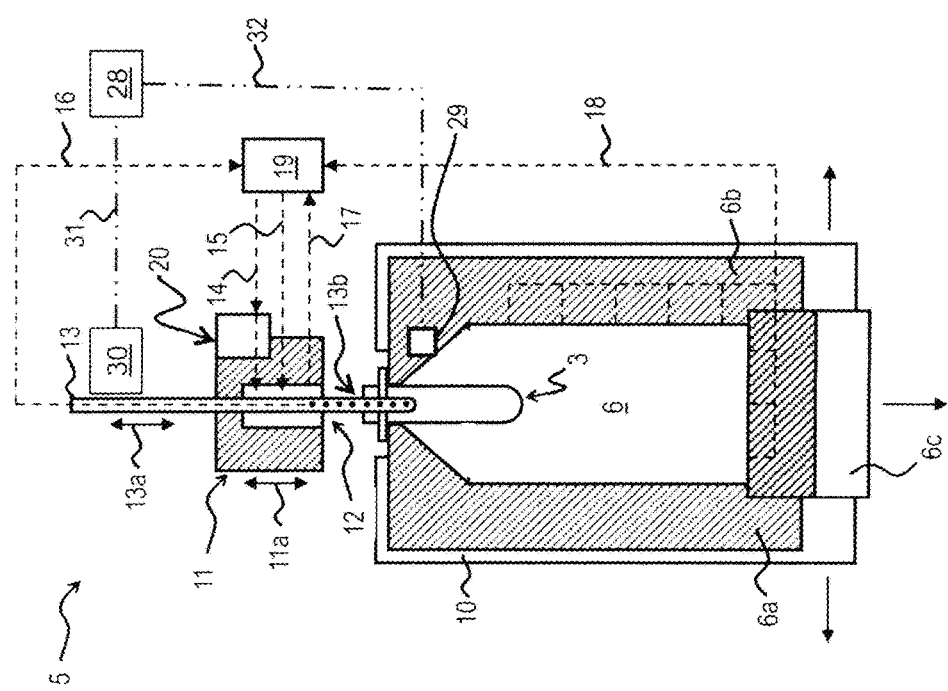
FIG. 2 shows a not-to-scale schematic representation of a treatment station of a form fill machine.

FIG. 2 shows a side view of a treatment station 5. In said figure, a valve head 11 and the stroke 11a of the valve unit relative to the hollow mold 6 are shown. The hollow mold 6 comprises the mold components 6a to 6c. The hollow mold is held by a mold carrier 10, in particular by a multi-part mold carrier. The hollow mold is opened for introducing the plastic preforms and for removing the plastic containers (as indicated by the arrows in FIG. 2), and closed for the molding and filling processes. In addition, the figure shows a fluid or blowing nozzle 12. FIG. 2 also shows a stretching rod 13, by means of which the plastic preform is stretched to the desired length (corresponds to the height of the finished plastic container) by insertion of said stretching rod 13 into the plastic preform down to the bottom of the hollow mold, and the stroke 13a of the stretching rod relative to the valve unit. The stretching rod is provided with openings 13b for feeding and/or extracting the molding fluid and the product, respectively. The feed line for the molding fluid 14 and the feed line for the product 15 may each optionally be provided with a valve (which is here not shown). The figure shows various extraction lines, which may each optionally comprise a valve, viz. the hydraulic extraction line 16 for the molding fluid, the pneumatic extraction line 17 for the interior of the container during filling and the pneumatic extraction line 18 for the hollow mold and the exterior of the container during filling. The treatment station shown in the present figure additionally comprises a media distributor 19, e.g. a joint rotary distributor for the treatment stations, and a compressor 20 for the molding fluid. The figure additionally shows an adjustment unit 30 for the stretching rod, by means of which the stroke 13a and thus also the insertion depth of the stretching rod are adjusted. In addition, an optionally provided control and/or closed-loop control unit 28 is shown, which communicates with the adjustment unit via the data link 31. Furthermore, an optionally provided filling level meter 29 is shown, which communicates with the control and/or closed-loop control unit via the data link 32.

FIGS. 3 to 6 show a case where the plastic container 2 has already been molded making use of the stretching rod and the molding fluid used for such molding has already been removed from the plastic container. In this case, the stretching rod was used for filling in the molding fluid and for stretching the plastic container. It is expedient to use the stretching rod also for the purpose of filling, since it will then not be necessary to first remove the stretching rod and to then introduce a filler neck.

FIGS. 3 to 5 represent different successive moments in time of an embodiment of the method. FIG. 6 represents a moment in time after the end of the method according to the present disclosure, at which the stretching rod has been removed from the container. In the course of the method according to the present disclosure, the stretching rod 13 was introduced down to the bottom of the hollow mold for stretching the preform, and it also remained there after the molding step and was used for filling in the product 21. The insertion depth of the stretching rod is reduced while the filling level 26 rises. The insertion depth of the stretching rod is here automatically adjusted by the adjustment unit, which is here not shown, controlled by a control unit, which is here not shown either. The shape of the plastic container 2, the amount of product to be filled in and the filling speed are predetermined as parameters in a control unit (which is here not shown either), so that the time-dependent adjustment of the insertion depth can be carried out without making use of a filling level meter. In this case, the stretching rod is immersed in the product during the entire filling process.

Alternatively, also a closed-loop control unit may control the insertion depth based on measurement values of the filling level. The stretching rod need not be immersed in the product during the entire filling process. The method may also be executed with a filler neck instead of a stretching rod, in particular when the use of a stretching rod could already be dispensed with during the molding step.

FIG. 3 shows a plastic container 2 in the form of a bottle that has already been fully molded, the stretching rod 13 being inserted in said bottle down to the bottom thereof. The here shown insertion depth 23 of the stretching rod results from the distance between the upper edge of the bottle 33 and the lower edge of the stretching rod 13. Line 26 designates the actual filling level of the product in the bottle. Line 27 designates the maximum admissible filling level and line 35 the desired filling level. There is a difference in height 36 between the maximum admissible filling level 27 and the desired filling level 35.

In FIG. 4 the stretching rod 13 is adjusted such that its insertion depth 34 is less deep than the insertion depth in FIG. 3. In addition, a larger amount of product has been filled in in comparison with FIG. 3, so that the actual filling level 26 has risen, but is still below the desired filling level 35.

In FIG. 5 the insertion depth 34 of the stretching rod 13 is even less deep than that in FIGS. 3 and 4. Moreover, the actual filling level 26 has now risen above the desired filling level 35, but is still below the maximum admissible filling level 27.

In FIG. 6 a moment in time (which is no longer part of the method according to the present disclosure) after the end of the filling process and after the removal of the stretching rod 13 is shown, the product having here the desired filling level 35, i.e. the desired ullage 25 remains in the area having the height 36.

Figure 7:
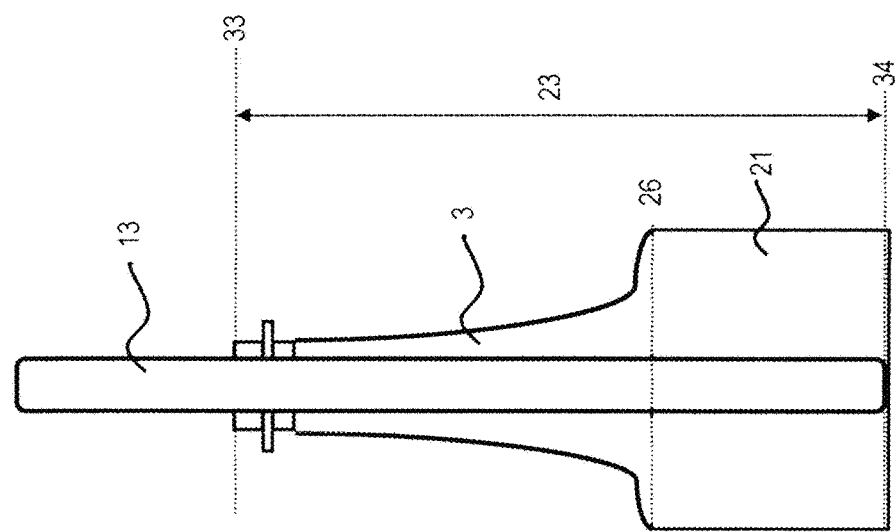
FIG. 7 shows a not-to-scale schematic representation of a container at a moment in time during the filling and molding process.

The above described principle is, in a similar way, also applicable to other embodiments, viz. the case that the product is used for molding the plastic containers, the time-dependent shape and the time-dependent volume of the container depending then on the amount of product supplied and on the pressure with which the product is supplied. In order to accomplish full molding of the container, it will be of advantage when the predetermined maximum admissible filling level lies in the already premolded neck area of the container, so that the product will mold the entire shoulder area of the bottle. FIG. 7 shows a moment in time of such a method with reference numerals corresponding to those used in the preceding figures.

Figure 8:
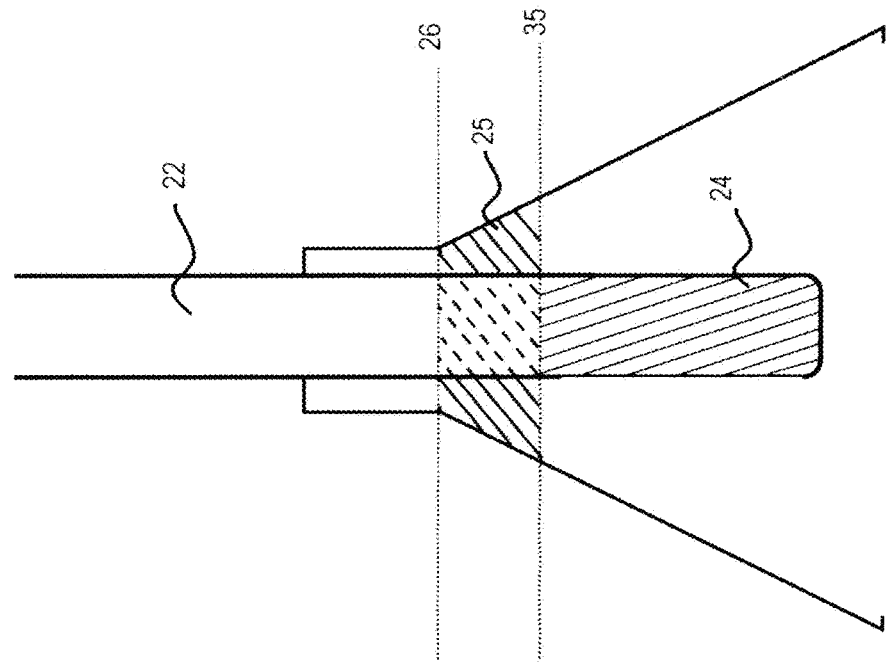
FIG. 8 shows a not-to-scale schematic representation of a detail of a container at the end of the filling process prior to the removal of the stretching rod or of the filler neck.

FIG. 8 shows an enlarged view of the bottle neck having a filler neck 22 inserted therein. In this representation, the molding and filling process has been finished. The situation shown here also applies to the end of the two above described methods, in the case of which the plastic container has inserted therein the stretching rod instead of the filler neck. The volume 24 displaced in the product by the filler neck corresponds to the predetermined desired ullage 25. It should be taken into consideration that the filler neck is hollow in the interior thereof so that product will only be displaced by its walls, especially when the filler neck is completely emptied at the end of the filling process. The insertion depth 34 of the filler neck may already correspond to the insertion depth in FIG. 7 during the whole filling process or it may have been reduced during the filling process from an originally larger insertion depth.

It goes without saying that features mentioned in the above described embodiments are not limited to these special combinations and may also be provided in arbitrary other combinations.

The invention claimed is:

1. A method for forming and filling plastic containers wherein the resultant filled containers comprise a predetermined ullage, the method comprising:
   forming, by means of expansion, plastic preforms into plastic containers in a hollow mold,
   filling a substantially liquid product or at least a liquid or solid component of the product into the plastic containers in the hollow mold, wherein the product is filled into the plastic containers while the respective plastic container has inserted therein a filler neck, and
   adjusting, based at least on measurement values of a filling level meter and the predetermined ullage, an insertion depth of the filler neck during filling such that, when filling has terminated, the volume displaced in the product by the filler neck corresponds to the predetermined ullage.

2. The method according to claim 1, further comprising adjusting the insertion depth of the filler neck such that an actual filling level will not exceed a maximum admissible filling level in the plastic container at any moment in time during the filling process.

3. The method of claim 2, wherein the adjusting of the insertion depth of the filler neck is in a time-dependent manner.

4. The method according to claim 1, further comprising reducing the insertion depth of the filler neck as the filling level rises.

5. The method of claim 4, further comprising reducing the insertion depth of the filler neck such that the filler neck is at least partially immersed in the product during the entire filling process.

6. A form fill machine, comprising
   at least one treatment station for forming, by means of expansion, plastic preforms into plastic containers in a hollow mold and for filling a substantially liquid product or at least a liquid or solid component of the product into the plastic containers in the hollow mold, wherein the filled containers comprise a predetermined ullage,
   an adjustment unit for adjusting an insertion depth of a filler neck into the plastic container, and
   a control and/or closed-loop control unit provided to control the adjustment unit for adjusting, based at least on measurement values of a filling level meter and the predetermined ullage, the insertion depth of the filler neck, wherein
   the insertion depth of the filler neck is adjustable via the adjustment unit during filling such that, when filling has terminated, the volume displaced in the product by the filler neck corresponds to the predetermined ullage.

7. The form fill machine according to claim 6, wherein the insertion depth is adjustable via the adjustment unit such that an actual filling level will not exceed a maximum admissible filling level in the plastic container at any moment in time during the filling process.

8. The form fill machine according to claim 6, wherein the control and/or closed-loop control unit controls the adjustment unit such that an actual filling level will not exceed the maximum admissible filling level in the plastic container at any moment in time during the filling process.

9. The form-filling machine according to claim 8, wherein the insertion depth is reduced such that the filler neck is at least partially immersed in the product during the entire filling process.

10. The form fill machine according to claim 6, wherein the control and/or closed-loop control unit controls the adjustment unit such that the insertion depth of the filler neck will be reduced as the filling level rises.

11. The form-filling machine according to claim 6, wherein the control and/or the closed-loop control unit controls the adjustment unit in a time-dependent manner.

* * * * *